F. STITZEL.
SPRING WHEEL.
APPLICATION FILED MAR. 6, 1913.

1,085,641.

Patented Feb. 3, 1914.

WITNESSES

INVENTOR
Frederick Stitzel
by Wm H Finckel
Attorney

UNITED STATES PATENT OFFICE.

FREDERICK STITZEL, OF LOUISVILLE, KENTUCKY.

SPRING-WHEEL.

1,085,641.  Specification of Letters Patent.  Patented Feb. 3, 1914.

Application filed March 6, 1913. Serial No. 752,442.

*To all whom it may concern:*

Be it known that I, FREDERICK STITZEL, a citizen of the United States, residing at Louisville, in the county of Jefferson and State of Kentucky, have invented a certain new and useful Improvement in Spring-Wheels, of which the following is a full, clear, and exact description.

This invention relates to the type of spring wheel illustrated in the Seaton Patents Nos. 861,542, 867,614, 912,627 and 922,344, and the object of the invention is to avoid the counteracting of oppositely arranged springs, and to secure the benefit of the tension of the several springs in taking the load. This object is attained by using compression springs and mounting them so as to secure a large if not a maximum amount of efficiency.

The invention consists of a combination of compression springs horizontally arranged between rigid bearings, preferably fixed on one of the wheel members, and flexible bearings on the other wheel member, substantially as I will proceed now to explain and finally claim.

Figure 1:
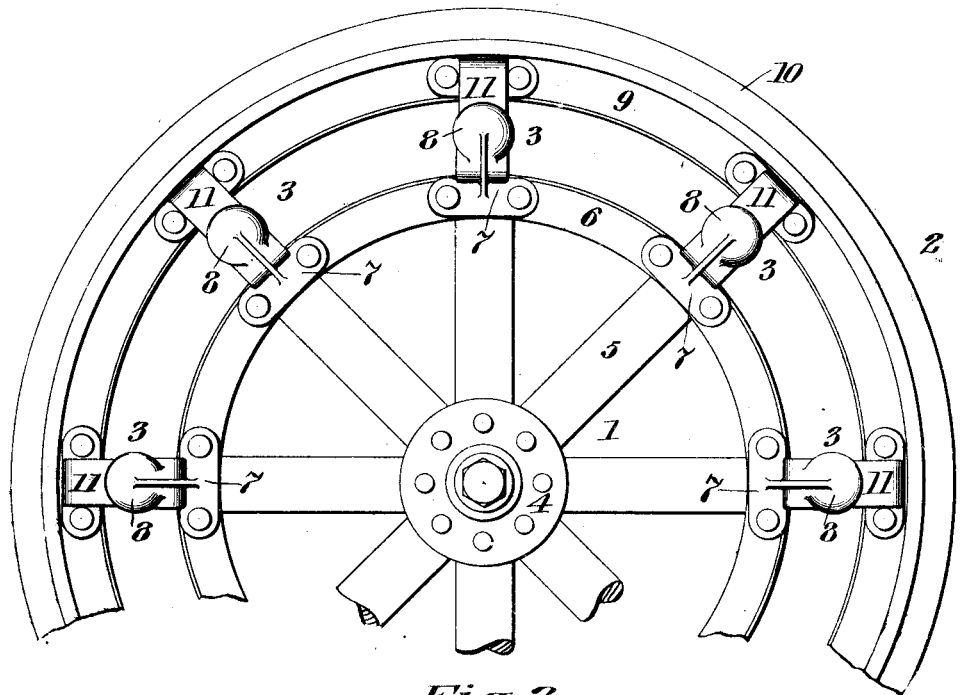
Figure 2:
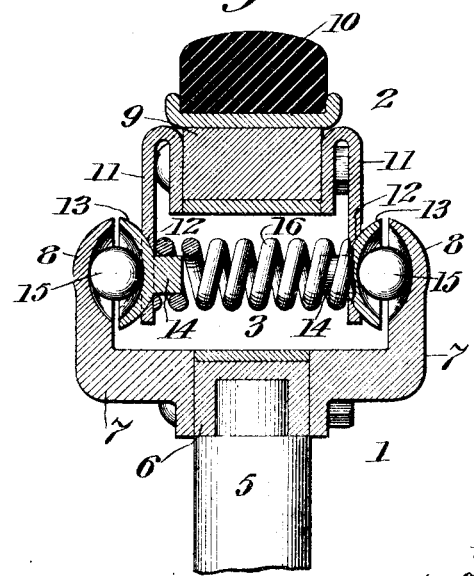

In the accompanying drawings illustrating the invention, in the several figures of which like parts are similarly designated, Figure 1 is an elevation of a portion of a wheel, and Fig. 2 is a vertical section, on a larger scale, taken through one of the spring connections.

The wheel is composed of an inner wheel member 1, and an outer wheel member 2, and a series of spring connections 3, which couple the wheel members together in such way that the wheel responds resiliently to the load.

The inner member 1 may be of any approved construction, and is here shown as built up of a hub 4, spokes 5 and a rim 6. Fixed to the rim 6 are a series of rigid bearing pieces 7, arranged in pairs, set opposite one another, and including the vertically disposed cups 8. The outer member 2 likewise may be of any approved construction, and is here shown as including a felly 9 and tire 10. Fixed to the felly 9 of the outer member 2, are the hangers 11 also arranged in pairs and set opposite one another and of more or less flexible, resilient or elastic nature, and extending toward the fixed bearing pieces 7 and between them. These hangers or flexible bearings 11 are made with cupped holes 12 in which are set the self-adjusting cups 13, having the bosses 14.

The cups 8 and 13 have bearing balls 15 interposed between them and of a size enough smaller than the cups to permit shifting as the load varies on the wheel.

Compression springs 16 are mounted horizontally or transversely of the wheel, on the bosses 14, between the hangers 11, so as to yield laterally as the wheel turns, the balls rolling in the cups as the inner member moves with relation to the outer member and always preserving the elasticity of the springs. Any strains in excess of the resistance of the springs will be cared for by the flexibility or resilience of the hangers, without impairing the efficiency of the connections.

The springs are placed in position between the fixed bearings and the hangers and held therein under compression to the proper degree. Any movement of the inner member of the wheel in any direction will tend to further compress the springs, and all of the springs will be affected alike.

It will be observed that the springs and their supports are carried wholly by the flexible hangers, without any fixed connection of said hangers or springs or their supports with the other member of the wheel, but in such position and relation to the latter as to respond to the movements of said member.

Variations in the structure and arrangement of parts is permissible within the spirit and scope of the invention.

What I claim is:—

1. A spring wheel, comprising an inner member and an outer member, said inner member movable with relation to said outer member, and spring connections for such members, including rigid bearings on one member, flexible bearings on the other member, compression springs interposed between and wholly supported by the flexible bearings and movable means interposed between the rigid bearings and the flexible bearings and acting upon the springs.

2. A spring wheel, comprising an inner member and an outer member, said inner member movable with relation to said outer member, and spring connections for such members, including rigid bearings on one member, flexible bearings on the other member, ball cups arranged in said bearings, balls interposed between said cups, and compression springs interposed between these bearings and supported by the ball-cups in the flexible bearings.

3. A spring wheel, comprising an inner member and an outer member, said inner member movable with relation to said outer member, and spring connections for such members, including rigid bearings on one member, flexible bearings on the other member, ball cups arranged in said bearings, balls interposed between said cups, and compression springs interposed between these bearings, the cups of one set of bearings having bosses engaging the ends of the springs to support them.

4. A spring wheel, comprising an inner member and an outer member, said inner member movable with relation to said outer member, and spring connections for such members, including rigid bearings on the inner member, flexible hangers depending from the outer member and extending between the rigid bearings, and compression springs wholly supported in said hangers and responsive to the movements of the inner member.

5. A spring wheel, comprising an inner member and an outer member, said inner member movable with relation to said outer member, and spring connections for such members, including rigid bearings on the inner member having ball cups, flexible hangers on the outer member extending between the rigid bearings and having self-adjusting ball cups arranged near their ends and opposite the cups of the rigid bearings and having bosses, balls arranged in said cups, and compression springs mounted upon said bosses and extending transversely of the wheel between the bearings and hangers.

6. A spring wheel, comprising an inner member and an outer member, said inner member movable with relation to said outer member, and spring connections for such members, including pairs of rigid bearings fixed on one of the members, pairs of flexible bearings fixed on the other member and extending between the rigid bearings, and compression springs wholly supported by the pairs of flexible bearings.

7. A spring wheel, comprising an inner member and an outer member, said inner member movable with relation to said outer member, and spring connections for such members, including pairs of rigid bearings on the inner member having ball cups, pairs of flexible hangers on the outer member extending between the rigid bearings and having self-adjusting ball cups arranged near their ends and opposite the ball cups of the rigid bearings and having bosses projecting inwardly, balls interposed between the cups and in rolling engagement therewith, and compression springs supported between said hangers on said bosses.

In testimony whereof I have hereunto set my hand this 4th day of March, A. D. 1913.

FREDERICK STITZEL.

Witnesses:
GEORGE MERCKE,
KATIE WELSH.